United States Patent [19]

Adams

[11] Patent Number: 5,427,808
[45] Date of Patent: Jun. 27, 1995

[54] METHOD FOR PRESERVING AND DISPLAYING FRESH MUSHROOMS

[75] Inventor: Loyal Adams, Scipio, Utah

[73] Assignee: United Foods, Inc., Bells, Tenn.

[21] Appl. No.: 203,513

[22] Filed: Feb. 28, 1994

Related U.S. Application Data

[63] Continuation of Ser. No. 830,933, Feb. 4, 1992, abandoned.

[51] Int. Cl.6 .................................................. A23L 1/212
[52] U.S. Cl. .................................... 426/419; 229/120;
229/112; 229/131; 229/164; 312/114; 426/106
[58] Field of Search ................... 426/106, 418, 419;
206/45.34, 44 R; 229/162, 120, DIG. 14, 131,
112, 164; 312/213, 114, 116, 117, 126

[56] References Cited

U.S. PATENT DOCUMENTS

| | | | |
|---|---|---|---|
| 1,002,543 | 9/1911 | Schaefer | 312/114 |
| 1,126,258 | 1/1915 | Myers | 206/45.34 |
| 1,398,154 | 11/1921 | Reid | 229/131 |
| 1,853,219 | 4/1932 | Newton | 229/131 |
| 1,953,765 | 4/1934 | McClungy | 426/419 |
| 1,961,137 | 6/1934 | Haan | 312/114 |
| 1,967,642 | 7/1934 | Williams et al. | 229/120 |
| 1,974,552 | 9/1934 | Wallbank | 229/131 |
| 1,979,514 | 11/1934 | Wilson | 312/114 |
| 2,125,523 | 8/1938 | Smith | 206/45.34 |
| 2,131,376 | 9/1938 | Hunt et al. | 206/45.34 |
| 2,152,911 | 4/1939 | Nemoede | 229/120 |
| 2,345,000 | 3/1944 | Newsom | 229/120 |
| 2,452,174 | 10/1948 | Arnold | 229/DIG. 14 |
| 3,144,191 | 8/1964 | Saidel | 229/131 |
| 3,184,047 | 5/1965 | Gilman et al. | 206/45.34 |
| 3,249,214 | 5/1966 | Aust | 229/162 |
| 3,369,728 | 2/1968 | Royce | 229/120 |
| 3,480,197 | 11/1969 | Massey | 426/106 |
| 3,703,383 | 11/1972 | Kuchenbecker | 229/120 |
| 3,863,829 | 2/1975 | Merrill | 229/112 |
| 3,949,931 | 4/1976 | Hall | 229/120 |
| 4,175,691 | 11/1979 | Cornell et al. | 229/120 |
| 4,285,558 | 8/1981 | Medford | 312/117 |
| 4,339,036 | 7/1982 | Jensen | 229/120 |
| 4,373,659 | 2/1983 | Cornell et al. | 229/120 |
| 4,597,503 | 7/1986 | Lates | 220/676 |
| 4,676,371 | 6/1987 | Byrne | 206/45.34 |
| 4,699,312 | 10/1987 | Owen | 229/112 |
| 4,842,875 | 6/1989 | Anderson | 426/419 |
| 4,886,372 | 12/1989 | Greengrass et al. | 426/419 |
| 5,108,000 | 4/1992 | Stoll et al. | 229/164 |

FOREIGN PATENT DOCUMENTS 2531042  2/1984  France ............................ 426/419

OTHER PUBLICATIONS

Washington Post Dec. 1985.
J of Food Protection vol. 41 #5 May 1978 pp. 348 plus.
Applied Microbiology Dec. 1975 pp. 964 plus.
J. Sci Fd. Agric 1973, 24, pp. 1371 plus.

*Primary Examiner*—Steven Weinstein
*Attorney, Agent, or Firm*—Cooper & Dunham

[57] ABSTRACT

A method for preserving and displaying fresh mushrooms is provided which minimizes air flow, moisture penetration and mushroom shrink. The container method includes disposing fresh mushrooms in a container which has a plurality of ventilation openings and a cover. The container is transparent to provide an upscale and attractive display and to allow a consumer to see the container's contents.

8 Claims, 2 Drawing Sheets

5,427,808

METHOD FOR PRESERVING AND DISPLAYING FRESH MUSHROOMS

This is a continuation of application Ser. No. 07/830,933, filed Feb. 4, 1992 now abandoned.

BACKGROUND OF THE INVENTION

1. Field of the Invention

This invention relates to containers, and more specifically, to display and preservation containers for the preservation, storage and display of fresh vegetables, and particularly mushrooms.

2. Description of the Background

Fresh mushrooms generally are sold in the produce section of grocery stores along with other vegetables. However, unlike most other vegetables, fresh mushrooms have a relatively high cost per pound. Therefore, retailers attempt to maximize the shelf life of fresh mushrooms and sell as much of their inventory as possible. The shelf life of fresh mushrooms is reduced primarily due to mushroom shrink (dehydration and deterioration).

Because fresh mushrooms are very sensitive to ambient conditions, mushroom shrink largely occurs as a result of improper storage. Retailers generally store and display fresh mushrooms only in corrugated shipping boxes. However, corrugated boxes are porous and permit excessive air flow through the boxes and expose the mushrooms to temperature changes. Exposure to air and extreme temperatures causes the mushrooms to dehydrate and shrink.

Mushroom shrink also occurs as a result of placement of mushrooms beside other vegetables in the produce section of grocery stores. Retailers periodically mist, or water, produce to keep the vegetables looking fresh. However, unlike other vegetables, misting causes fresh mushrooms to deteriorate, and they rapidly lose their fresh appearance.

Therefore, it is desirable to provide a container for displaying and storing mushrooms, which protects the mushrooms from exposure to ambient conditions and misting, thereby preventing dehydration, deterioration and shrink. At the same time, the container should be ventilated and easy to clean. Also, the container should be durable yet easy to handle, and attractive enough for display.

SUMMARY OF THE INVENTION

The present invention addresses and solves the problems faced by fresh mushroom retailers by providing a preservation and display container which precludes excessive air flow, while having a plurality of ventilation openings, at least one cleaning opening and a cover. The container preferably is transparent to provide an upscale and attractive display and to allow a consumer to see the container's contents.

When made in accordance with the present invention, air flow through the container is limited, thereby protecting the contents from exposure to the atmosphere and temperature changes occurring during display and storage. The present invention is particularly suited for use with fresh mushrooms. By reducing air flow and exposure to extreme temperature changes, and by preventing misting, the present invention increases the shelf life of fresh mushrooms and maintains the product's fresh appearance.

The above and other objects, features, and advantages of the present invention will become apparent from the following detailed description of preferred embodiments when read in conjunction with the accompanying drawings, in which the same reference numerals are used to identify the same or similar parts in the several views.

DETAILED DESCRIPTION OF PREFERRED EMBODIMENTS

Figure 1:
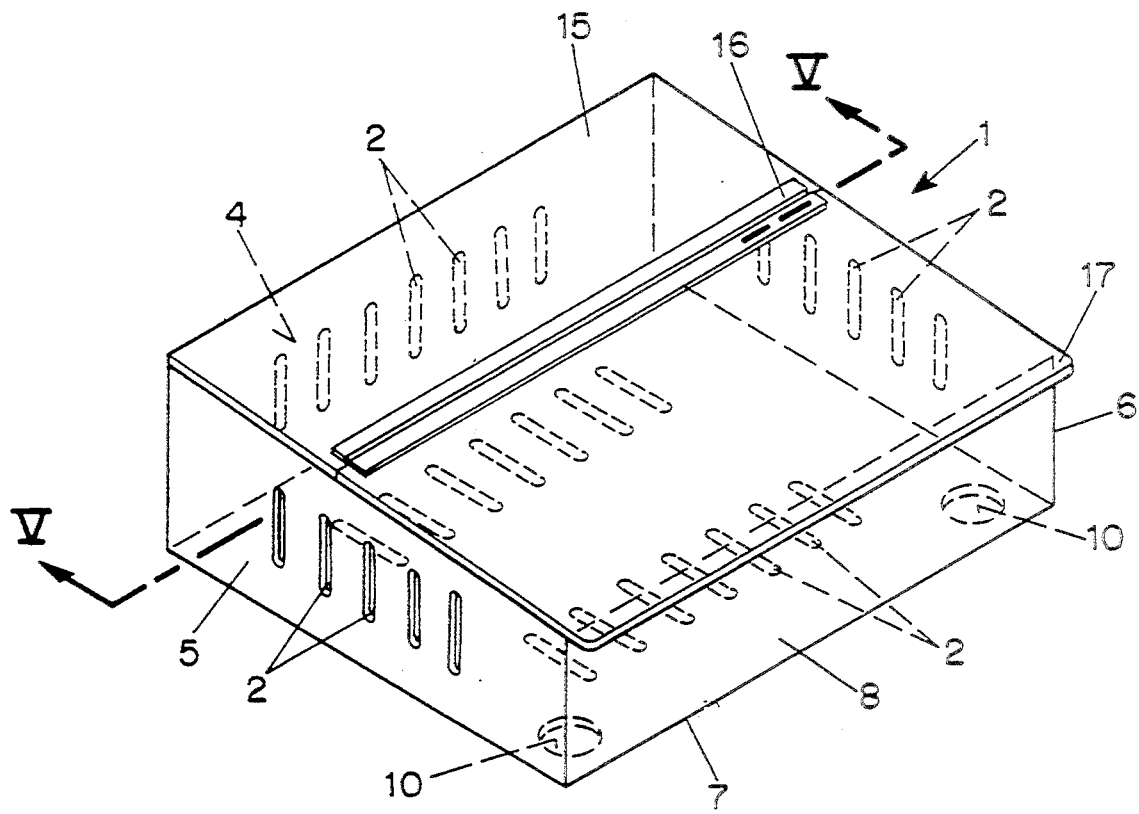
FIG. 1 is a perspective view of a preservation and display container according to an embodiment of the present invention.

With reference to the drawings, and particularly to FIG. 1, a preservation and display container 1 is shown according to an embodiment of the present invention. The container 1 is made from a material which essentially is impervious to air and is designed to minimize air flow through the container. The contents, particularly mushrooms, are thereby insulated from exposure to extreme temperature changes to prevent dehydration and shrink. The material preferably is transparent so that container can serve as an attractive display box and consumers can see its contents. Glass or plastic are suitable materials, although ¼-inch plastic sheet material, such as plexiglass or polycarbonate, is preferred.

Although the material forming the container is airtight, some ventilation is required. Therefore, ventilation openings 2 are selectively arranged along the walls of the container to provide limited ventilation of the contents. In the embodiment of FIG. 1, ventilation openings are arranged on the back wall 4, side walls 5 and 6, and bottom wall 7. However, the present invention contemplates forming ventilation openings at other selected locations in the container. The ventilation openings 2 are shown as a preferred elliptical-shaped slot. The ventilation openings comprise less that about 10% of the surface area of the walls 4–7 and are not present on the front and top of the container.

Figure 4:
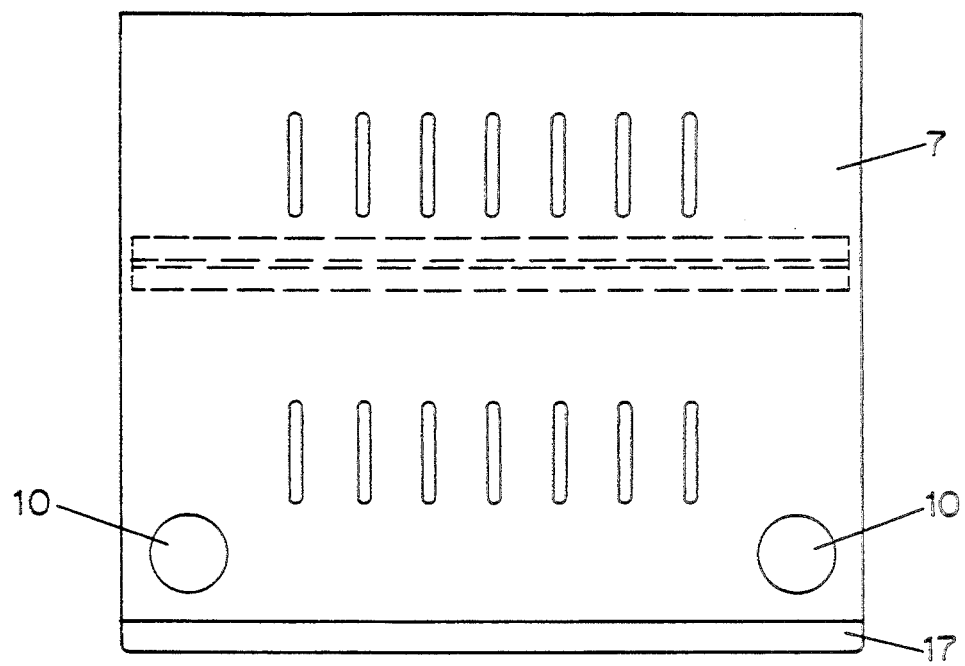
FIG. 4 is a bottom view of the preservation and display container illustrated in FIG. 1.

As best illustrated in FIG. 4, the container of the present invention also includes cleaning openings 10 formed in the bottom wall 7.

A cover 9 is provided for access to the interior to fill and remove the contents of the container. According to a first embodiment of the present invention, the container includes a top panel 15, extending partially across the top of the container and integral with the rear 4 and sides 5, 6 of the container. The cover 9 is connected to top panel 15 by a piano hinge 16. Cover 9 extends across the top of the container, from panel 15 to front wall 8. In its opened position, cover 9 is lifted to rotate about hinge 16, uncovering a portion of the top of the container. In its closed position, the cover 9 rests on the upper edges of sides 5, 6 and front 8 of the container.

There are no ventilation openings provided in the cover.

The cover 9 extends slightly beyond front wall 8 to form a lip 17. The lip 17 is useful as a handle for opening and closing the cover. The cover 9 also may include an emblem to describe the contents or advertise a brand name.

It is contemplated that cover 9 can be hinged for opening along any line at the top of the container. However, it is preferred that cover 9 comprise about ½ to about ⅔ of the top of the container to minimize the weight of the cover 9 while providing easy access to the container's interior.

Figure 5:
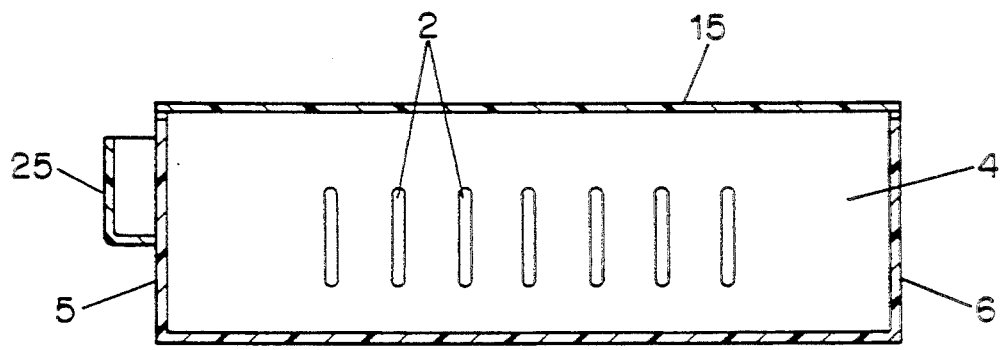
FIG. 5 is a cross-sectional view of the preservation and display container of FIG. 1, taken along line V—V, modified to show another embodiment of the present invention.

FIG. 5 shows a portion of a preservation and display container according to another embodiment of the present invention. A bin 25 is attached to a side wall of the container. For customers' convenience, bags can be stored in the bin 25 and can be used to carry the product, such as individual mushrooms, removed from the container. Alternatively, a hook can be used to hang bags for customers' use.

Conveniently, the preservation and display container of the present invention is adapted to accommodate the corrugated bulk boxes generally used to ship and display fresh produce. Therefore, the produce can be displayed in the present invention containers, and the containers will not require special handling by shippers and retailers.

The container is made by assembling walls 4–8 and top panel 15 to form the container, and securing the walls together by a conventional adhesive. Alternatively, the container can be molded in a single form. Cover 9 then is hinged to the forward edge of top panel 15.

Figure 2:
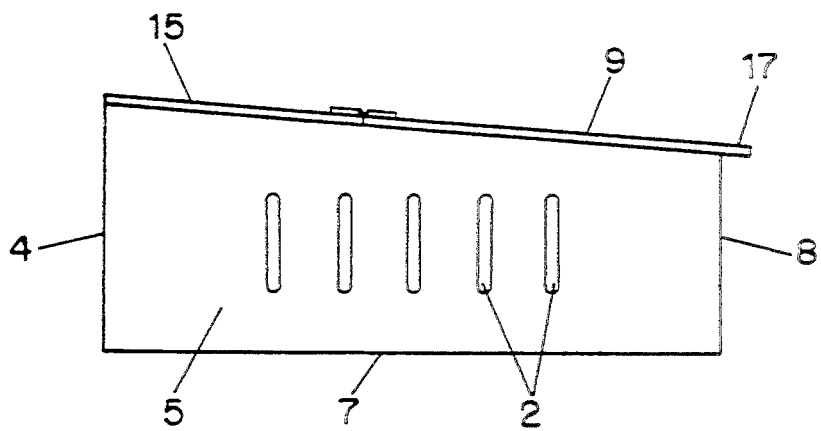
FIG. 2 is a left side view of the preservation and display container illustrated in FIG. 1.
Figure 3:
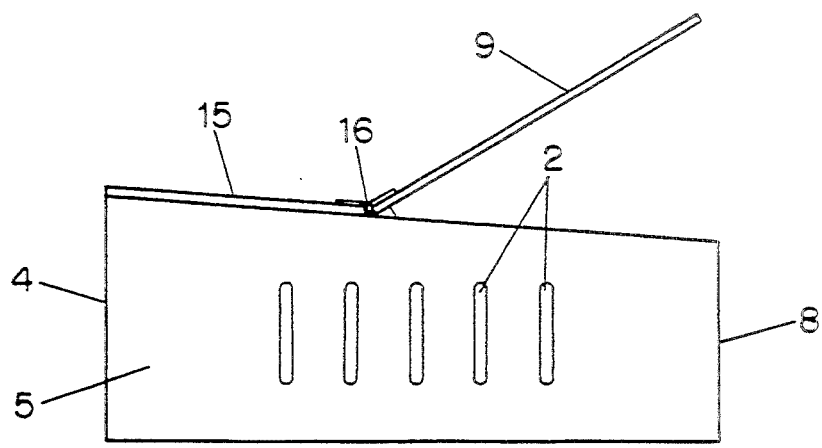
FIG. 3 is a left side view of the preservation and display container of FIG. 1, showing the cover in an open position.

As illustrated in FIGS. 2 and 3, the upper edges of side walls 5 and 6 can be cut on a bias, so that the cover 9 slopes downward toward the front wall 8 to create a billboard effect, to accentuate a symbol which may appear on the cover. This makes it easier for the user to read any symbol or advertising on the cover.

In the presently preferred form, the container is 21" wide, 17" deep, 7" high at the rear wall and 5.5" high at the front wall. The cover is 21" wide and 11" deep. There are 7 ventilation openings in the rear wall 4, 5 openings in each of the side walls 5 and 6, and 14 openings (2 rows of 7 each) in the bottom 7.

Although the preservation and display container of the present invention was specially designed to store and display fresh mushrooms, it can be used for any product which must be protected from excessive airflow, extreme temperature changes, or moisture.

Any variations or modifications of the present invention envisioned by one of ordinary skill in the art are contemplated to be within the scope of this invention.

I claim:

1. A method for preserving and displaying fresh mushrooms for sale on a produce selling shelf, the method comprising disposing the mushrooms in a container capable of minimizing mushroom deterioration, dehydration and shrinkage, the container being formed of an air- and moisture-impervious material capable of precluding air flow across and moisture penetration of the mushrooms, the container comprising a back wall, a front wall, a bottom wall, two side walls, and a top wall, the top wall comprising both a top panel extending partially across the top of the container and a cover connected to the top panel by a hinge, the cover comprising about ½ to about ⅔ of the top wall of the container and the cover extending beyond the front wall of the container to form a lip to enable a user to repeatedly open and close the container by manipulating the cover without removing it as it rotates about the hinge, the container further comprising a plurality of ventilation openings arranged in at least two of the back, bottom and two side walls of the container sufficient to provide limited ventilation of the mushrooms, the method further including disposing the container containing the mushrooms on the produce selling shelf for display, storage and sale, and adjacent other produce, the front wall and top wall devoid of the ventilation openings, such that although the mushrooms are subject to limited ventilation through the ventilation openings, the container prevents wetting of the mushrooms when adjacent produce is misted, thus preventing the mushrooms from dehydrating, deteriorating and shrinking during display.

2. The method of claim 1, wherein the method further comprises attaching a receiving means to a wall of the container for holding bags in which a user can carry away mushrooms removed from the container.

3. The method of claim 1, wherein the container is transparent.

4. The method of claim 1, wherein the container is formed of glass.

5. The method of claim 1, wherein the container is formed of plastic.

6. The method of claim 1, wherein an identifying symbol is placed on a wall of the container.

7. The method of claim 1, wherein the ventilation openings in the container comprise less than 10% of the surface area of the back, bottom and two side walls of the container.

8. The method of claim 1, wherein upper edges of the two side walls of the container are disposed at an angle to the bottom wall, such that the cover of the container rests on the angled upper edges and is positioned on a bias with respect to a user.

* * * * *